Sept. 14, 1965   A. HUET   3,205,939
SYMMETRICAL DISTRIBUTOR ASSEMBLY FOR FLUIDS IN A
THERMAL MULTIPLE INSTALLATION
Filed March 8, 1960

United States Patent Office 3,205,939
Patented Sept. 14, 1965

3,205,939
SYMMETRICAL DISTRIBUTOR ASSEMBLY FOR FLUIDS IN A THERMAL MULTIPLE INSTALLATION
André Huet, 48 Ave. du President Wilson, Paris, France
Filed Mar. 8, 1960, Ser. No. 13,545
Claims priority, application France, Mar. 9, 1959, 788,832
2 Claims. (Cl. 165—144)

For thermal installations, particularly those in which the heat of the fluid issuing from a nuclear reactor is to be recovered in order to convert water into steam, I have already proposed an installation with a plurality of identical columns traversed by the hot fluid issuing from the reactor and which contains the elements necessary for the production of steam, possibly in several stages of pressure.

All these columns are substantially identical and function in the same manner, provided that they are supplied with heating fluid and water at equal speed, pressure and temperature. It is therefore important, especially when for the regulation of the fluid output only the indications furnished by some of the columns of the installation are used, to ensure that the supply of liquids to all columns of the installation is strictly identical.

The present invention has for its object a system of symmetrical distribution of these fluids, applicable both to the heating fluid issuing from the reactor, the water entering the columns, and the steam issuing therefrom. In this distribution system, a single main pipe for the fluid to be distributed terminates in a point which lies near the symmetrical axis of the points to be supplied and is called the distribution center, said distribution center being linked by pipes of substantially identical length and symmetrical arrangement either with the points to which distribution is to be affected, or to secondary distribution centers arranged in similar manner, i.e. near the symmetrical axis of an assembly of elements which are to be served by each of them. In this way the fluid is distributed from the initial distribution center to elements which it must reach through pipes of substantially equal diameter and length, pressure and heat losses being substantially the same, so that said fluid enters, or is removed, under the same conditions in all columns of the installation.

The application of this symmetrical distribution assembly is not limited to the thermal installations named here, but extends to all such thermal installations in which a fluid is to be distributed among different elements under identical conditions.

The following description, given by way of example and with reference to the annexed drawing, will make it easy to understand how the invention may be put into practical effect.

If, for example, an array of vertical columns $a$ is to be supplied with a hot fluid, then, instead of letting the duct $b$ for the heating fluid arrive in parallel with the plane of the columns, it will be made to terminate, according to the invention, in an initial distribution center $c$, situated perpendicularly to the symmetrical axis of columns $a$. The distribution center $c$ consists, for example, of a bulb into which the duct $b$ is formed and in the wall of which are provided tubular ends to which the various pipes are connected. It will also be sufficient to provide the tubular connections directly on the wall of the main duct $b$ whose end may be closed by any suitable means. In the example shown, the bulb $c$ provided on the duct $b$ comprises three tubular outlets $d^1$, $d^2$, $d^3$ to which are connected the pipes $e^1$, $e^2$, $e^3$ which link the center $c$ to the secondary centers $f^1$, $f^2$, $f^3$. The latter centers are situated in the symmetrical axis of the columns which each of them is to serve, and they are also constituted by bulb-shaped portions which may be provided on the pipes $e^1$, $e^2$, $e^3$. They are provided with nipples to which are connected the pipes $g^1$, $g^2$, $g^3$ each of which is connected to the highest point of one of the three columns $a$, said points being served by each secondary center. It will be seen that in this way the heating fluid traverses almost identical paths in order to supply all the columns $a$. The pipes $e^1$, $e^2$, $e^3$ and $g^1$, $g^2$, $g^3$ may all be more or less arc-shaped, and this will cause possible expansion differences to be absorbed.

Figure 1:
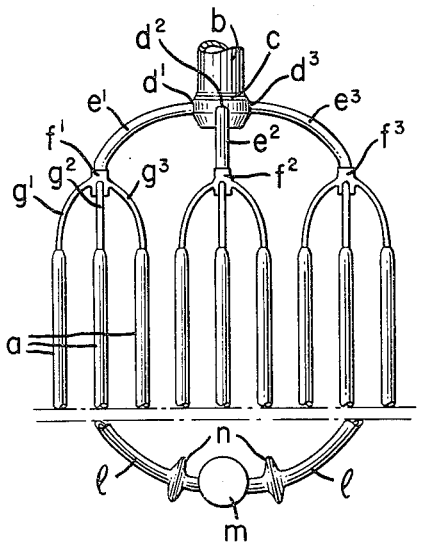
FIG. 1 shows a first embodiment of the invention for supplying a hot liquid to an array of vertical columns.

In the lower part of FIG. 1 part of a similar arrangement is shown which ensures the discharge of the heating fluid at the base of the columns $a$. In the two ducts 1 which terminate in the main outlet duct $m$ for the discharge of the heating fluid, are provided bellows $n$ which permit the expansion and torsion effects caused by temperature differences between the high and low regions of the installation to be absorbed.

Figure 2:
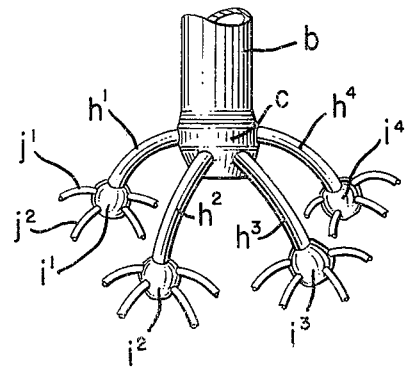
FIG. 2 shows, in a perspective view, an initial distribution center supplying four secondary distribution centers.

FIG. 2 shows a perspective view of an embodiment in which can be seen a main distribution center $c$ supplying through pipes $h^1$, $h^2$, $h^3$, $h^4$ four secondary distribution centers $i^1$, $i^2$, $i^3$, $i^4$ all of which are tapped by four pipes $j^1$, $j^2$, $j^3$, $j^4$. The secondary centers $i^1$, $i^2$, $i^3$, $i^4$ may be arranged at different heights which will allow the distribution to be arranged in an area of irregular shape.

Figure 3:
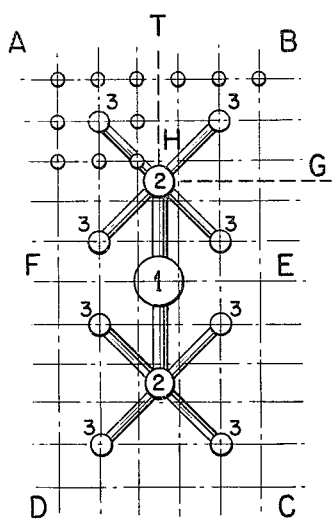
FIG. 3 shows diagrammatically a plan view of the distribution among an assembly of vertical columns occupying a rectangle.

In the embodiment of FIG. 3 there is shown a distribution system according to the invention which ensures, for example, the supply of a hot fluid to an assembly of vertical columns grouped over an area comprised in the rectangle A, B, C, D. The initial distribution center 1 is provided perpendicularly to the vertical passing through the symmetrical center of the rectangle A, B, C, D. This center supplies two secondary distributions centers 2 each of which is arranged perpendicularly to the symmetrical center of each of the squares A, E, B, F and E, C, D, F. Each of these centers 2 supplies in its turn four tertiary centers 3, situated respectively at a center of the component squares, for example B, G, H, I. Finally, each of the tertiary centers 3 supplies, either directly or through intermediate collector pipes, the columns which are grouped within a square such as B, G, H, I.

This mode of distribution is applicable not only to the heating fluid, but also to the water supply in the lower part of the columns, and equally to the derivation of steam at the upper part of these columns.

The primary or secondary distribution centers may, instead of being shaped as shown here by bulbs provided on the main ducts where the latter terminate, consist merely of the ends of said ducts which may be closed by any convenient means and on the lateral walls of which nipples are provided to which the secondary ducts are connected.

What I claim is:

1. A distributor assembly for fluids which vary in temperature in a thermal installation comprising, in combination, an assembly of a plurality of closely disposed heat-exchange elements each adapted to have two fluids pass therethrough, including a heating fluid from a nuclear reactor and water to be converted to steam by the heat transferred from said heating fluid, means to supply at least one of said fluids connected to supply fluid to said elements of said assembly disposed symmetrically with respect to said assembly comprising, a principal conduit defining a principal center of distribution, ducts connected to said distribution center to define a plurality of paths substantially under the same pressure for the fluid between the elements and the center of distribution and each having substantially the same cross-section, length and changes of direction, each of said ducts respectively communicating independently of each other with a respective one of a plurality of secondary distribution centers between said principal center and said elements, means defining a plurality of substantially spherical secondary distribution centers, and a plurality of secondary duct members between said secondary centers and respective ones of said elements, said secondary duct members defining flow paths of substantially equal cross section, length and changes of direction between said secondary centers and said respective elements, said principal distribution center being symmetrically disposed in relation to said secondary distribution centers, and said secondary distribution centers being symmetrically disposed in relation to said respective elements.

2. A distributor assembly for fluids which vary in temperature in a thermal installation comprising, in combination, an assembly of a plurality of closely disposed heat-exchange elements each adapted to have two fluids pass therethrough, including a heating fluid from a nuclear reactor and water to be converted to steam by the heat transferred from said heating fluid, means to supply at least one of said fluids connected to supply fluid to said elements of said assembly disposed symmetrically with respect to said assembly comprising, a principal conduit defining a principal center of distribution, ducts connected to said distribution center to define a plurality of paths substantially under the same pressure for the fluid between the elements and the center of distribution and each having substantially the same cross section, length and changes of direction, each of said ducts respectively communicating independently of each other with a respective one of a plurality of secondary distribution centers between said principal center and said elements, means defining a plurality of substantially spherical secondary distribution centers, and a plurality of secondary duct members between said secondary centers and respective ones of said elements, said secondary duct members defining flow paths of substantially equal cross section, length and changes of direction between said secondary centers and said respective elements, said principal distribution center being symmetrically disposed in relation to said secondary distribution centers, and said secondary distribution centers being symmetrically disposed in relation to said respective elements, each of said elements having the same length of flow path, an outlet center for receiving said one fluid from said elements, a plurality of tertiary ducts from said elements to said outlet center, said tertiary ducts defining paths of substantially equal cross section and changes of direction, and expansion bellows in said tertiary ducts to allow expansion and contraction of said tertiary ducts.

References Cited by the Examiner

UNITED STATES PATENTS

| | | | |
|---|---|---|---|
| 485,315 | 11/92 | Yaryan | 165—146 |
| 1,190,975 | 7/16 | Bachmann | 257—248 X |
| 1,215,041 | 2/17 | Lundberg | 257—229.7 |
| 2,059,255 | 11/36 | Lassiat | 137—561.1 |
| 2,110,430 | 3/38 | Swanson | 137—561.1 X |
| 2,203,075 | 6/40 | Bappler | 137—561.1 X |
| 2,770,259 | 11/56 | Zallea | 138—52 |
| 2,865,660 | 12/58 | Zallea | 138—52 X |
| 2,965,360 | 12/60 | Brown | 257—248 |
| 2,973,944 | 3/61 | Etter | 257—248 |
| 2,983,260 | 5/61 | Huet | 165—162 |

FOREIGN PATENTS 19,397    8/06    Great Britain.

ROBERT A. O'LEARY, *Primary Examiner*.

M. CARY NELSON, WILLIAM F. O'DEA, CHARLES SUKALO, *Examiners*.